Figure 1:
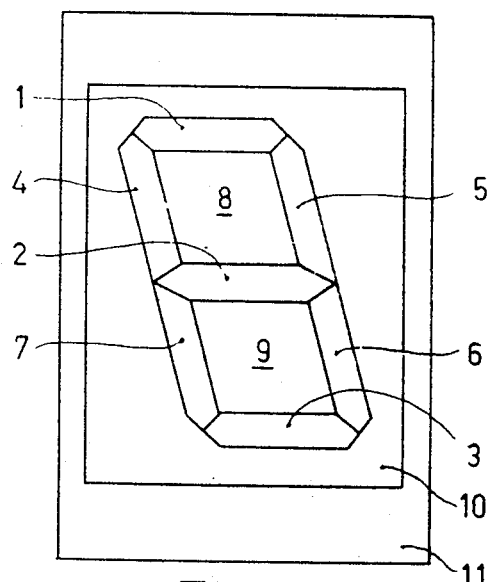

OR 3,854,794

United States
Van Dam et al.

[11] 3,854,794
[45] Dec. 17, 1974

[54] IMAGE DISPLAY CELL

[75] Inventors: Hendrik Tajapko Van Dam; Johannes Jacobus Ponjee; Cornelis Johannes Schoot, all of Emmasingel, Eindhoven, Netherlands

[73] Assignee: U.S. Philips Corporation, New York, N.Y.

[22] Filed: Dec. 11, 1972

[21] Appl. No.: 313,822

[30] Foreign Application Priority Data
Dec. 23, 1971 Netherlands ............... 7117713

[52] U.S. Cl. ............................... 350/160 R
[51] Int. Cl. ................................ G02f 1/28
[58] Field of Search .................. 350/160, 190, 311

[56] References Cited
UNITED STATES PATENTS
3,451,741  6/1969  Manos ................. 350/160
3,652,149  3/1972  Rogers ................. 350/160 R Primary Examiner—Ronald L. Wibert
Assistant Examiner—Paul K. Godwin
Attorney, Agent, or Firm—Frank R. Trifari; Norman N. Spain

[57] ABSTRACT

An image display cell having a transparent wall portion, electrodes and an oxidizable redox substance and a reducible redox substance in an electrochemically inert liquid in contact with electrodes. The cell includes at least two electrodes which are in contact with a cell liquid in which a colourless viologen salt (formula I) has been dissolved. When a potential difference of at least 0.5 Volt is applied to the electrodes, this salt is reduced to a coloured insoluble compound which adheres to the cathode, so that the latter is coloured, thereby producing an image.

8 Claims, 5 Drawing Figures

IMAGE DISPLAY CELL

The invention relates to an image display cell having a transparent wall part and provided with a reducible redox substance and an oxidizable redox substance in an electrochemically inert liquid which is in contact with at least two inert electrodes.

U.S. Pat. Spec. No. 3,451,741 describes such a cell wherein organic redox compounds are used which are converted into coloured oxidation products at the anode. Such an oxidation product colours the anode electrode surface and thus produces an image. Simultaneously an organic or inorganic redox substance is reduced at the cathode. The organic substance may be the same as the oxidation product formed at the anode. In this cell organic liquids are used.

The cell produces an image which may be erased by reversing the polarity of the electrodes, but also by applying no voltage to the electrodes, for the coloured oxidation product disappears by diffusion from the anode electrode, so that the latter becomes colourless. When the oxidizable redox substance and the reducible redox substance do not belong to the same redox pair the colour may also disappear owing to the fact that the oxidized (coloured) substance of one redox pair comes into contact with the reduced substance of the other redox pair by diffusion and is reduced by this substance and thus decoloured.

Hence, in the method of this patent maintaining a produced image requires the presence of a potential difference across the electrodes such that the decrease of the amount of coloured substance at the anode due to diffusion is compensated by newly formed coloured substance. This means that the cell has no "memory".

This is a disadvantage if an image is to be maintained for a comparatively long time and in particular when a battery is used as the energy source for operating the cell.

It is an object of the present invention to avoid such a disadvantage.

Image display cells in which the image is maintained even when no voltage is applied to the electrodes must satisfy a number of requirements.

a. The substance which on reaction at an electrode (the image electrode) is converted from its colourless form into its coloured form must in the colored form be substantially insoluble in the cell liquid, so that the colored form does not disappear from the image electrode by diffusion.

b. However, in its colourless form the substance must be highly soluble in the cell liquid to enable a sufficient amount of coloured substance to be formed. This requirement also is of great importance with respect to the speed at which an image is produced, because in the case of poor solubility of the colourless substance the speed at which the substance diffuses to the image electrode determines the response of the cell.

c. Further it is not sufficient for the coloured substance to be insoluble. In general an insoluble substance precipitates and collects on the bottom of the vessel containing it. For an image display cell this would mean that the image electrode is decoloured. Consequently the coloured insoluble substance must adhere to the electrode at which it is formed.

d. The coloured substance shall not be decoloured by reaction with the substance formed at the other electrode (the counter electrode). Hence the latter substance either must adhere to the electrodes at which it is formed or it must belong to the same redox pair as the coloured substance.

These requirements are satisfied by the invention of the instant case.

The instant invention relates to an image display cell having a transparent wall portion and provided with a reducible redox substance and an oxidizable redox substance in an electrochemically inert liquid which is in contact with at least two inert electrodes, characterized in that the electrochemically inert liquid is water, the reducible redox substance is a compound of the formula I

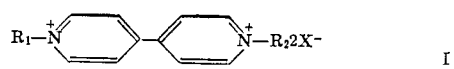

having a solubility in water in excess of $10^{-2}$ mole/l and the oxidizable redox substance is a compound of the formula

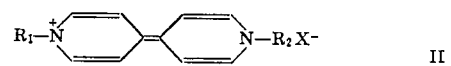

having a solubility product in water of less than 5 times $10^{-5}$ (concentrations in mole/l), in which formulae the symbols have the following meanings: $R_1$ and $R_2$ are a linear or branched alkyl, alkenyl, alkoxycarbonylalkyl or phenylalkyl group containing up to 10 carbon atoms, which may be substituted with halogen or nitrile, or a morpholinocarbonyl methyl group in which the morpholino group may be substituted with one or two methyl groups, and $X^-$ is a monovalent anion.

Examples of suitable monovalent anions are $ClO_4^-$, $BF_4^-$, $NO_3^-$, $Cl^-$, $Br^-$, $F^-$ and $C_6H_5SO_3^-$.

The solubility in water of the compounds of the formula I, hereinafter referred to as viologens, is found to increase as the size of the radicals $R_1$, $R_2$ and $X^-$ decrease.

The compounds of the formula II, hereinafter referred to as viologen radical salts, are found to have smaller solubility products as the size of the radicals $R_1$, $R_2$ and $X^-$ are increased.

A branched alkyl group $R_1$ or $R_2$ imparts a reduced solubility to the compound of the formula I and a smaller solubility product to a compound of the formula II than does a straight-chain alkyl group containing the same number of carbon atoms. $X^-$ When $R_1$ and $R_2$ represent linear alkyl groups the following combinations of $R_1$, $R_2$ and $X^-$ may, for example, be chosen:

| $R_1$ and $R_2$ | $X^-$ |
|---|---|
| $C_1 - C_6$ | $ClO_4^-$ |
| $C_4 - C_7$ | $BF_4^-$ |
| $C_5 - C_8$ | $Br^-$ |
| $C_6 - C_8$ | $NO_3^-$ |
| $C_4 - C_9$ | $Cl^-$ |
| $C_6 - C_{10}$ | $F^-$ |

With an anion $X^-$, as a rule, an alkenyl group is chosen which contains the same number of carbon atoms as, or one carbon atoms more than, the alkyl group which is combined with this anion.

An alkoxycarbonylalkyl group in general in combination with a given anion $X^-$ contains one carbon atom less than an alkyl group in combination with that anion $X^-$.

A phenylalkyl group as a rule is chosen to contain two carbon atoms more than does an alkyl group.

If a group $R_1$ or $R_2$ carries a nitrile group, the carbon skeleton of $R_1$ or $R_2$ may as a rule contain two carbon atoms less than an unsubstituted group.

If a group $R_1$ or $R_2$ carries a halogen atom, the number of carbon atoms of the group may in general be equal to the number of an unsubstituted group.

In contradistinction to the cell described in the aforementioned U.S. Pat. Spec. No. 3,451,741, in the cell according to the invention the coloured substance is not formed at the anode by oxidation of the leuco dye, but at the cathode by reduction of the uncoloured viologen.

This reaction may be represented as follows:

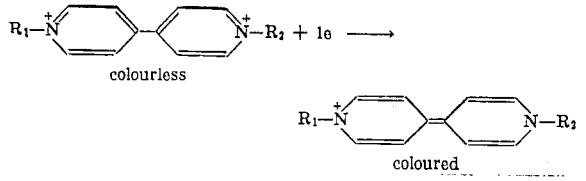

The reverse reaction takes place at the anode.

It should be noted that in our co-pending Netherlands Pat. application No. 7,009,521 (PHN. 4964) an image display cell is described which uses viologens. However, the said cell is different from the cell according to the present invention in several important respects.

The most important difference is that in the cell described in the said Netherlands Application the image disappears when the voltage is removed from the electrodes or when the voltage difference across the electrode drops below a threshold value.

The cell of said Netherlands patent application contains, in addition to the redox pair viologen/viologen radical, a second redox pair, for example tetrachlorohydroquinone/tetrachloroquinone or ferrous/ferric. Ferric or tetrachloroquinone may come into contact with viologen radical by diffusion, so that the latter is oxidized and loses its colour.

The cell of said Netherlands patent application also usually contains an organic solvent in which the coloured viologen radical is highly soluble. However, even if water is used in the cell, diffusion of the oxidation products formed at the anode gives rise to oxidation and hence decolouration of the viologen radical, while the image disappears when the voltage across the electrodes does not exceed the threshold value.

Thus, none of the embodiments of the cell described in the said Netherlands patent Application satisfies the requirement that the image should be maintained when the voltage across the electrodes drops below the threshold value.

The image display cell according to the present invention has a casing at least one wall or wall portion of which is transparent. It may be made from a synthetic material, glass or the like.

The electrodes may consist of stannic oxide, indium oxide, platinum, palladium, gold and other inert electrode materials. Obviously it is not necessary for all the electrodes to be made of the same material. The electrodes may alternatively consist of carbon. If the image is to be visually perceptible, a carbon electrode cannot be used as the image electrode, because the colour is not perceptible againt a black background.

The electrodes may be formed in a variety of shapes. Also, more than one anode and/or cathode may be used.

The image produced may have the same shape as the surface of the image electrode or as the visible part of this surface. When a transparent electrode is used as the image electrode, it may be deposited on the inner surface of the transparent wall of the casing. Part of the electrode may be coated with an electrically non-conducting material, for example, a synthetic material, in which case the image will have the same shape as the uncoated part of the electrode surface. As an alternative the wall of the cell may partly be screened by an external opaque mask, in which case the image produced has the same shape as the visible part of the image electrode.

The image electrode may alternatively be applied to the rear wall of the casing, so that the image is viewed through the transparent wall and the cell liquid. However, it is not necessary for the image electrode to be disposed on a wall of the casing, but it may be disposed at another location where it is surrounded by the cell liquid. In this case it may be preferable for the rear surface of the electrode to be coated with an electrically non-conducting material.

If the image is to be viewed from two directions, the image electrode may advantageously be located out of contact with a wall, because thus — in the case of a flat electrode — an image is produced on both surfaces.

Because in the cell according to the invention the coloured substance adheres to the electrode and does not disperse in the cell contents by diffusion, as is the case in the known cell, the colour formed may rapidly be removed by reversing the electrode polarity. This provides the important advantage that the response is not determined by the spacing between the anode and the cathode. Consequently the position of the anode relative to the cathode may be chosen at will. The anode may, for example, be at an angle of 90° to the cathode or be co-planar with it.

The said property also enables the electrodes to be disposed so that the colour which on erasure of the image on the image electrode is formed on the other electrode cannot be observed.

Up to now an image has been referred to which has the same shape as (the visible part of) the image electrode, but obviously the image alternatively be built up from a number of components which are provided by an equal number of image electrodes rendered operative.

If one or each image electrode is disposed in a transparent wall of the cell, the contrast of the image may be increased by dispersing an insoluble, for example white, substance in the cell liquid. Suitable such substances are titanium oxide and barium sulfate.

These substances may also be used to hide the electrodes other than the image electrodes.

For the same purpose a screen made, for example, of a porous or perforated material, may be disposed in the cell.

The cell according to the invention may be used not only for displaying images but also as a voltage indicator. If a voltage higher than the minimum voltage of about 0.5 volts required to cause the cell to respond is, or has been, set up across the electrodes, colour is observed on the image electrode.

A signal may, however, be observed by other than visual means. Since in the formation of colour the surface of the electrode is coated with a viologen radical, the potential of the electrode relative to the cell liquid changes. This change in potential can be observed by means of a reference electrode.

Even if the amount of electrical charge which has passed through the cell is not sufficient to form an amount of dye sufficient to be visually perceptible, the change in potential of the electrode relative to the cell liquid can be observed by means of a reference electrode.

Consequently the cell may be used as a means for recording that a voltage has been set up across the electrode, causing a small amount of charge to pass through the cell, in other words, the cell may be used as a storage element. Obviously in such use of the cell the transparent wall portion of the cell need not be optically transparent.

Reference electrodes may be made of the same material as the image electrodes, however, as an alternative electrodes made from glass, calomel and the like may be used.

Reference electrodes may also be used to reduce the time required for the production of the image to a minimum. If a comparatively high potential difference is set up across a cathode and an anode of a cell, the viologen in the vicinity of the cathode will be rapidly reduced. Further increase of the amount of reduced viologen at the cathode will then be determined by the speed at which viologen is transported from the medium to the cathode. However, side reactions may occur, for example formation of hydrogen, which is undesirable.

To prevent this, the potential difference across the electrodes is chosen so that always a sufficient amount of viologen can diffuse to the cathode. The rate at which initially dye is formed on the cathode is lower than in the aforementioned case.

If a reference electrode is disposed near the cathode, the advantage of a rapid reaction due to a large potential difference may be combined with the advantage of the use of a smaller potential difference, namely that side reactions are prevented. The potential difference produced across the cathode and the reference electrode by the application of a potential difference across the cathode and the anode may continuously compared with a potential difference which is lower than, or equal to, the maximum permissible potential difference between the cathode and the reference electrode. If, for example, the measured potential difference is greater, the potential difference across the cathode and the anode may be reduced until the desired potential difference across the cathode and the reference electrode is reached.

If required, an electrolyte may be added to the cell liquid to increase the conductivity. For this purpose preferably an alkali metal salt, an alkaline earth salt, a metal salt or a tetraalkylammonium salt is used. Obviously the anion of this salt must not form an insoluble salt with the viologen cation. As a rule, the cell liquid will not contain more than 2 moles of salt per litre.

The cell may be manufactured, for example, by the following method. A casing is provided with the desired number of electrodes and filled with a solution of a viologen salt and, if desired, an electrolyte. Then an auxiliary electrode, for example a calomel electrode, is inserted into the liquid and a voltage is applied across the auxiliary electrode and one or more of the cell electrodes, the auxiliary electrode acting as the anode. Then the auxiliary electrode may be removed and the cell may be sealed.

Instead of a calomel electrode another electrode may be used which then is connected to the cell liquid by means of a salt bridge.

Another method consists in which an electrode which has previously been coated with a viologen radical is inserted in the cell. In the operation of the cell this electrode may serve either as an electrode or only as a means of introducing a viologen radical salt into the cell. An electrode coated with a viologen radical salt is obtainable by electrolysis of an aqueous solution of a compound of the formula I, in which method the solution may contain, for example, a ferrous salt as the oxidizable substance or — if a viologen chloride or bromide is used — the halide ion is oxidized or the solution is in contact with the anode space via salt bridge.

As an alternative, a small amount of an aqueous solution of a soluble viologen radical salt obtained by electrolysis of a viologen solution connected to the anode space by a salt bridge may be added to the cell liquid.

The added viologen radical will either precipitate with anions from the cell liquid, if the substituents $R_1$ and $R_2$ exceed those of the viologen in the cell liquid or it will react with the viologen from the cell liquid, after which the viologen radical salt formed precipitates.

If now a potential difference is applied across the electrodes of the cell, a viologen radical salt will be formed at the cathode, while at the anode chlorine, bromine or oxygen is formed, depending upon whether the cell liquid contains, or does not contain, chloride or bromide ions.

The cell then is agitated to bring the precipitated radical salt into contact, and to cause it to react, with the chorine, bromine or oxygen formed, after which the cell is ready for use.

It should be noted that the added viologen (radical), because it is present in a far smaller amount (for example at a maximum 1 mole percent than the compound of the formula I, does not play any further role in the operation of the cell.

As a further alternative, a small amount of a solution of a violoen radical salt in an organic solvent, for example acetonitrile, may be added to the cell liquid. Thus the reduced form of the compound of the formula I contained in the cell may be added to the cell liquid. However, the substance will immediately precipitate owing to its insolubility in water.

After current has been passed through the cell, the oxidation product formed at the anode is reacted with the precipitate in the manner used in the previously described method.

In general the image display cell is operated with a potential difference of from 0.5 volt to 10 volts across the image electrode and the counter electrode. As a rule a potential difference between 0.5 volt and 4 volts is applied.

A visually perceptible image will as a rule be obtained in about 0.01 second.

The concentration of the viologen in the cell liquid will usually be between 0.01 and 0.2 mole/litre.

Some of the compounds of the formula I are unknown. They are obtainable by coupling bipyridyl with a halide by means of a Menskhutkin reaction. The preparation of a number of compounds has been described, inter alia, by Michaelis in J.Gen. Physiol. No, 16, 859 (1933).

The resulting halides may simply be converted into other salts. For example, the addition of silver sulfate enables a silver halide to be precipitated, a solution of the viologen sulfate being obtained. From this, for example, barium sulfate may be precipitated by the addition of a barium salt, for example barium nitrate, a solution of viologen nitrate being obtained.

The invention will now be described more fully with reference to the following Examples.

FIG. 1 of which shows a metal plate forming part of the wall of an image display cell and having etched out portions corresponding to a segmented viewing electrode for a numerical readout device, and associated electrodes and counter electrode.

Figure 5:
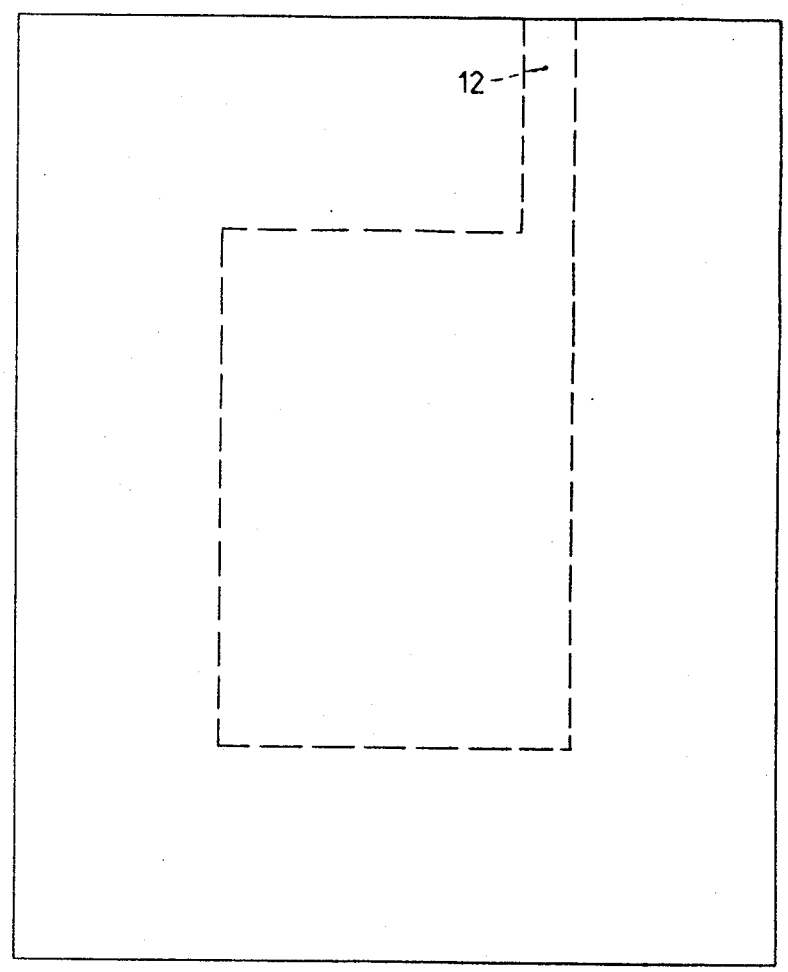
Figure 2:
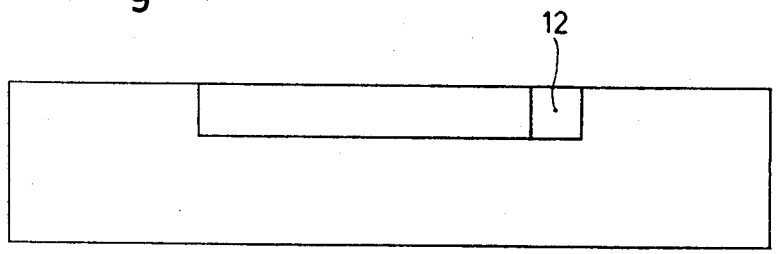

FIGS. 2 and 5 which show a transparent portion of the cell with a recess for filling the cell with the liquid.

Figure 3:
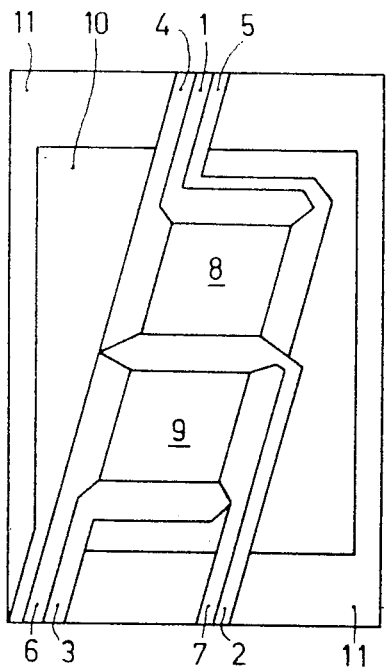

FIG. 3 of which shows a transparent wall portion of the cell bearing a metallic portion corresponding to a segmented viewing electrode and the associated reference electrode and the counter electrode.

Figure 4:
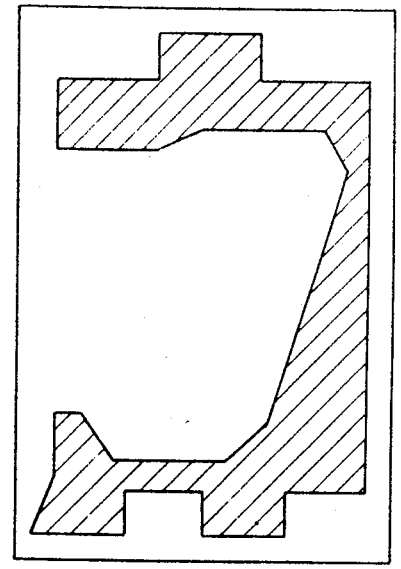

FIG. 4 of which shows a portion of the metallic pattern of FIG. 3 coated with a transparent insulating lacquer.

EXAMPLE 1.

A glass cuvette two opposed walls of which were internally coated with a $SnO_2$ electrode, was washed with nitrogen for 24 hours. The surface area of each electrode was 1.5 cm$^2$, the electrode spacing was 1 cm. The resistance of the $SnO_2$ electrodes, which was measured by applying a voltage to two conductive strips provided along two opposed sides of an electrode, was 10 Ohms.

The cell was filled with an aqueous solution of N,N'-diheptyl-4,4'-dipyridinium dibromide (0.1 mole/litre) which previously had been heated to boiling in a stream of nitrogen. To the cell liquid two drops of a solution of N,N'-diethyl-4,4'-dipyridinium bromide (0.001 mmole) were added, which solution was made by electrolysis of an aqueous solution of N,N'-diethyl-4,4'-dipyridinium dibromide with the use of a platinum electrode, the latter solution being connected by a salt bridge with a ferrochloride solution containing a platinum anode. The cell was closed by a glass stopper.

A direct voltage of 2.7 volts was applied to the electrodes for 1 second. The cathode was coloured violet. Bromine was formed at the anode. The cell was agitated so that the bromine was brought into contact and into reaction with a precipitate of N,N'-diheptyl-4,4'-dipyridinium bromide which had been formed by reaction of N,N'-diethyl-4,4'-dipyridinium bromide with N,N'-diheptyl-4,4'-dipyridinium dibromide.

The polarity of the electrodes was then reversed for 1 second, the violet colour disappearing from one electrode and being formed at the other electrode. The cell was stored without the application of a voltage for 14 days. In this period no change in extinction was produced and the cell liquid remained colourless.

EXAMPLE 2.

Example 1 was repeated with the difference that a white plate of polytetrafluorethene provided with perforations having a diameter of 0.2 mm (relative spacing 3 mm) was interposed between the two electrodes. Thus the counter electrode was hidden from view.

EXAMPLE 3.

Example 1 was repeated with a cell a sidewall and part of the front wall of which were coated with $SnO_2$ electrodes, the result being the same.

EXAMPLE 4

Example 1 was repeated with the difference that the cell was filled with an aqueous solution of N,N'-diethyl-4,4'-dipyridinium diperchlorate (0.05 mole/litre). 2 drops of a solution of N,N'-dibutyl-4,4'-dipyridinium nitrate (0.001 mmole) were added to the cell liquid, whereupon N,N'-dibutyl-4,4'-dipyridinium perchlorate precipitated. A potential difference of 4 volts was applied across the electrodes for one-half second. The cell was agitated to bring the oxygen formed at the anode into contact with the precipitate. Then the cell was ready for use. A potential difference of 4 volts was applied to the electrode for 0.5 second, whereupon the cathode was coloured violet. After the cell had been stored without the application of a voltage for 14 days, the image was unchanged.

EXAMPLE 5.

Example 1 was repeated with the difference that 0.1 ml of a solution of N,N'-diheptyl-4,4'-dipyridinium bromide (0.001 mmole) in acetonitrile was added. The substance precipitated. The cell was then put into operation in the same manner as described in Example 1.

EXAMPLE 6.

After a cell had been filled with an aqueous solution of N,N'-diheptyl-4,4'-dipyridinium dibromide a calomel electrode was inserted into the solution. A potential difference of 4,5 volts was applied to the calomel electrode (anode) and one of the cell electrodes (cathode) for 30 seconds. The cathode was coloured violet. The calomel electrode was removed and the cell was sealed with a glass stopper, after which it was ready for use.

EXAMPLE 7.

Example 1 was repeated with aqueous solutions of

| $R_1$ | $R_2$ | $X^-$ |
|---|---|---|
| n-$C_3H_7$ | n-$C_3H_7$ | $ClO_4^-$ |
| i-$C_3H_7$ | i-$C_3H_7$ | $BF_4^-$ |
| i-$C_3H_7$ | i-$C_3H_7$ | $ClO_4^-$ |
| n-$C_4H_9$ | n-$C_4H_9$ | $BF_4^-$ |
| n-$C_4H_9$ | n-$C_4H_9$ | $ClO_4^-$ |
| n-$C_5H_{11}$ | n-$C_5H_{11}$ | $Br^-$ |
| n-$C_5H_{11}$ | n-$C_5H_{11}$ | $BF_4^-$ |
| $CH_3$ | $CH_3$ | $ClO_4^-$ |
| $C_2H_5$ | $C_2H_5$ | $ClO_4^-$ |
| n-$C_5H_{11}$ | n-$C_5H_{11}$ | $ClO_4^-$ |
| 3-$CH_3C_6H_8$ | 3-$CH_3C_6H_8$ | $BF_4^-$ |
| n-$C_6H_{13}$ | n-$C_6H_{13}$ | $ClO_4^-$ |
| n-$C_6H_{13}$ | n-$C_6H_{13}$ | $BF_4^-$ |
| n-$C_6H_{13}$ | n-$C_6H_{13}$ | $Br^-$ |
| n-$C_6H_{13}$ | n-$C_6H_{13}$ | $Cl^-$ |
| n-$C_6H_{13}$ | n-$C_6H_{13}$ | $F^-$ |
| n-$C_7H_{15}$ | n-$C_7H_{15}$ | $BF_4^-$ |

-Continued

| $R_1$ | $R_2$ | $X^-$ |
|---|---|---|
| $n\text{-}C_7H_{15}$ | $n\text{-}C_7H_{15}$ | $Br^-$ |
| $N\text{-}C_7H_{15}$ | $n\text{-}C_7H_{15}$ | $Cl^-$ |
| $n\text{-}C_7H_{15}$ | $n\text{-}C_7H_{15}$ | $F^-$ |
| $n\text{-}C_7H_{15}$ | $n\text{-}C_7H_{15}$ | $NO_3^-$ |
| $n\text{-}C_7H_{15}$ | $n\text{-}C_7H_{15}$ | $C_6H_5SO_3^-$ |
| $n\text{-}C_8H_{17}$ | $n\text{-}C_8H_{17}$ | $Br^-$ |
| $n\text{-}C_8H_{17}$ | $n\text{-}C_8H_{17}$ | $Cl^-$ |
| $C_6H_5CH_2$ | $C_6H_5CH_2$ | $Br^-$ |
| $C_6H_5C_3H_6$ | $C_6H_5C_3H_6$ | $Br^-$ |
| $n\text{-}C_5H_{11}$ | $n\text{-}C_7H_{15}$ | $Br^-$ |
| $n\text{-}C_5H_{11}$ | 3,5-dimethyl-morpholino carbonylmethyl | $BF_4^-$ |
| 3,5-dimethyl-morpholino-carbonylmethyl | 3,5-dimethyl-morpholino carbonylmethyl | $BF_4^-$ |
| * $3\text{-}CH_3C_4H_8$ | $3\text{-}CH_3C_4H_8$ | $Br^-$ |

EXAMPLE 8.

Grooves have a depth of 0.5 mm and a width of 0.1 mm were formed according to the pattern shown in FIG. 1 in a nickel plate 0.5 mm thick. A nickel wire was welded to each resulting segment. The plate was then placed in a mould which was filled with a synthetic resin in an amount such that the grooves were filled with the resin and the attached wires protruded from the resin. After the resin had hardened the assembly was ground until so much nickel and resin had been removed from the plate that the segments were electrically disconnected from one another. The plate was polished and coated with a layer of gold by electrodeposition. A transparent plate of Perspex provided with a recess as shown in FIG. 2 was cemented to the first plate. The cell was filled through the recess 12 with the same solutions as described in Example 1 and the opening 12 was closed with a Perspex stopper and then sealed with a cement. The resulting cell was operated in the manner described in Example 1. The segments designated by the numbers 1 to 7 were the image electrodes, electrodes 8 to 10 were the reference electrodes and electrode 11 was the counter electrode. For the operation of the cell a circuit arrangement was used which compared the voltage set up between the display electrodes switched on and one of the reference electrodes with a given signal voltage and which so controls the current flowing through the counter electrode and the image electrodes that the measured voltage becomes equal to the signal voltage. At a signal voltage of 1 volt all the operative image electrodes were coloured a deep purple after 0.01 second, whereupon the voltage was removed from the display electrodes.

EXAMPLE 9.

A Perspex substrate was coated with a film of gold by deposition from vapour. The pattern of FIG. 3 was etched in the film. Part of the film (the part shaded in FIG. 4) was coated with an electrically insulating transparent lacquer. A cell was constructed and operated in the manner described in Example 8.

EXAMPLE 10

A nickel plate was provided with grooves in the manner described in Example 8, with the difference that instead of the figure 8 a hole of 10 by 15 mm² was formed. Into this hole 25 platinum wires were inserted at right angles to the plate surface to serve as image electrodes. The assembly was embedded in resin, ground and polished in the manner described in Example 8. The electrodes 10 and 11 were coated with a film of gold. The cell was then finished and operated in the manner described in Example 8, with the difference that the operative electrodes were switched off after only 100 µs. By means of a high-resistance volt meter (input impedance > 1 MΩ) it was possible to detect which electrodes had been turned on and which had not. In the first case a voltage difference of 90 millivolts was measured between the reference electrode 10 and the relevant image electrodes, whereas in the second case no voltage difference could be measured. The information stored in this manner can be erased in less than 100 µs.

What is claimed is:

1. An image display cell comprising a casing having a transparent wall part a reducible redox substance and an oxidizable redox substance in water within said casing and at least two inert electrodes in contact with said water, both the reducible redox substance and the oxidizable redox substance being present in the cell, said reducible redox substance having a solubility in water in excess of $10^{-2}$ mole/liter and being a compound of the formula 1

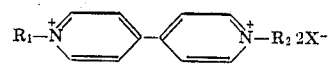

said oxidizable redox substance having a solubility product in water of less than $5 \times 10^{-5}$ mole/liter and being a compound of the formula II

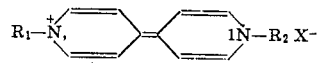

$R_1$ and $R_2$ in said formulae are each moieties selected from the group consisting of alkyl, alkenyl, alkoxycarbonylalkyl and phenylalkyl of one to 10 carbon atoms, halogen substitution products thereof, nitrile substitution products thereof and morpholinocarbonylmethyl substituted with up to two methyl groups in the morpholina moiety and $X^-$ is a monovalent anion.

2. An image display cell as claimed in claim 1 wherein the formulae I and II $X^-$ is a moiety selected from the group consisting of $ClO_4^-$, $BF_4^-$, $NO_3^-$, $Cl^-$, $Br^-$, $F^-$ and $C_6H_5SO_3^-$, 3. An image display cell as claimed in claim 1, wherein each anode is arranged at an angle to each cathode.

4. An image display cell as claimed in claim 3 wherein each anode is coplanar with each cathode.

5. An image display cell as claimed in claim 1 wherein a white insoluble substance is dispersed in the cell liquid.

6. An image display cell as claimed in claim 1, wherein a porous screen is interposed in the cell between the anode and each cathode.

7. An image display cell as claimed in claim 1 wherein the cell contains at least one reference electrode positioned relatively close to the cathode.

8. An image display cell as claimed in claim 1 wherein the cell liquid contains a salt which increases its conductivity.

* * * * *